2 Sheets--Sheet 1.

J. F. TAYLOR.
Platen for Lever and Toggle Presses.

No. 162,121.                               Patented April 13, 1875.

WITNESSES:
W. W. Hollingsworth
John C. Kenow

INVENTOR:
John F. Taylor
BY
ATTORNEYS.

THE GRAPHIC CO. PHOTO-LITH. 39 & 41 PARK PLACE, N.Y.

2 Sheets--Sheet 2.
J. F. TAYLOR.
Platen for Lever and Toggle Presses.
No. 162,121. Patented April 13, 1875.
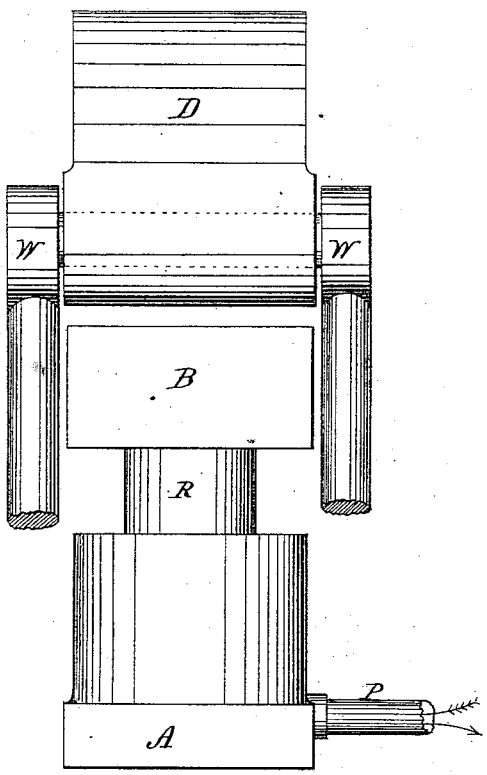
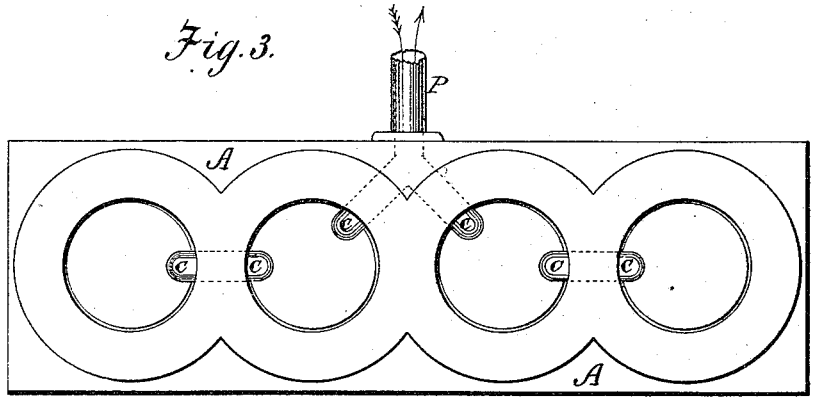

UNITED STATES PATENT OFFICE.

JOHN F. TAYLOR, OF CHARLESTON, SOUTH CAROLINA.

IMPROVEMENT IN PLATENS FOR LEVER AND TOGGLE PRESSES.

Specification forming part of Letters Patent No. 162,121, dated April 13, 1875; application filed February 24, 1875.

*To all whom it may concern:*

Be it known that I, JOHN F. TAYLOR, of the city and county of Charleston and State of South Carolina, have invented a new and Improved Platen for Progressive Lever or Toggle-Joint Press; and I do hereby declare that the following is a full, clear, and exact description of the same, reference being had to the accompanying drawing forming a part of this specification, in which—

Figure 1:
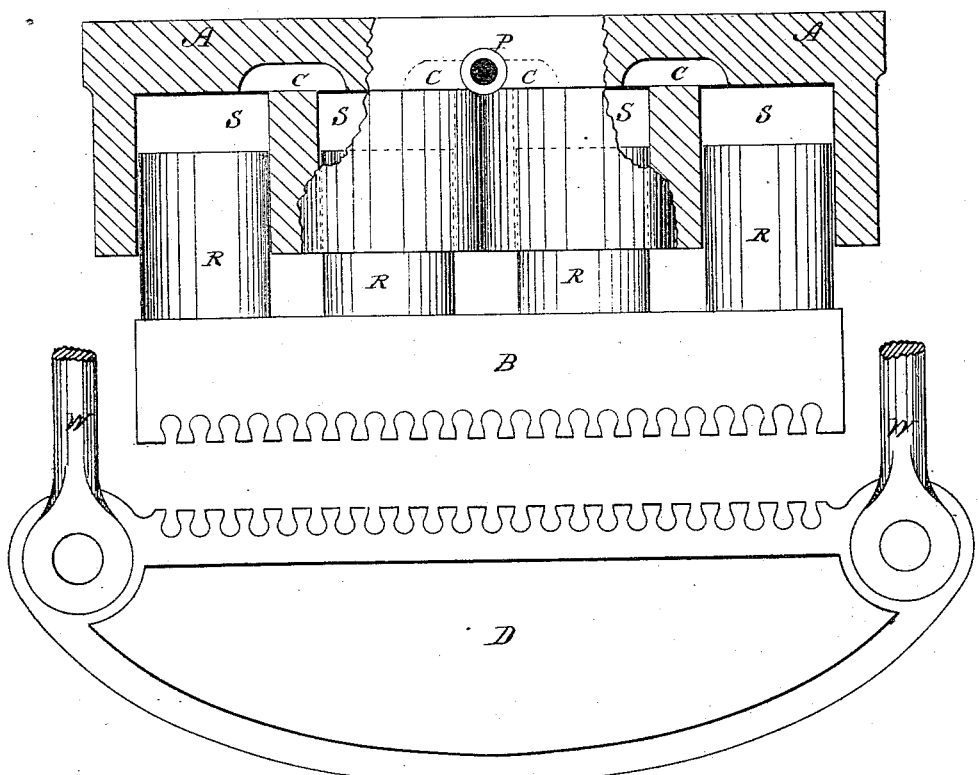
Figure 1:
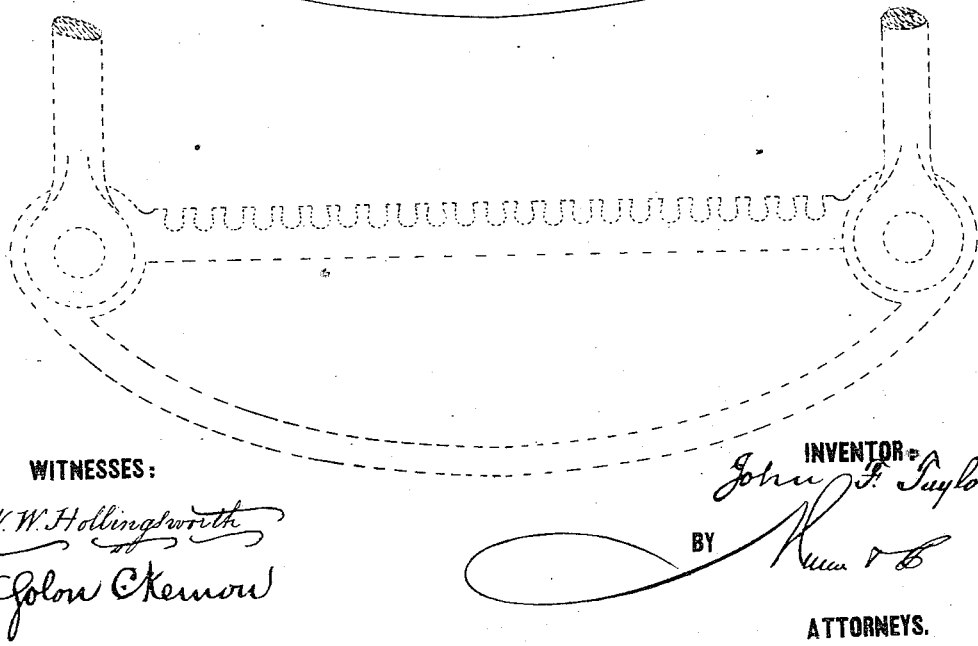

Figure 1 is a vertical front elevation, partly in section; Fig. 2, a side elevation; Fig. 3, a plan view of the stationary part of the compound platen.

The object of this invention is to provide a means for rectifying the unequal degree of compression in bales compressed by the progressive-lever or toggle-joint mechanism. Presses operating upon this system are given a definite space between the fixed and movable platen, within which space the bale is to be compressed. If the bale be smaller than the average size, it only occupies this space, and is not sufficiently compressed, and if it be larger than the average, it cannot be compressed into this space, and the movable platen stops before the greatest available power from the toggle has been utilized, the said toggle-arms operating with the greatest power just before they reach their limit of motion.

My invention rests in the construction of a compound platen, which consists of an immovable part and a movable part, one part having cylinders and water-ways and the other part having rams or pistons and a suitable packing, so that, if a larger bale is being compressed, and it is found that the toggle-arms fail to exert their maximum power, sufficient water may be let out of the cylinder to rectify the same, and if a smaller bale is not sufficiently compressed water may be forced into the cylinder and made to operate the rams when the toggles reach their limit of motion.

In the drawing, A represents one part, constructed with cylinders S, water-ways C, and an inlet or outlet pipe, P. B is the other part of the platen, having pistons or rams R, which are tightly packed and move within the cylinders S. D is the movable platen, to which are attached the toggle-arms W. Now, if a space of nine inches be left as the space to be occupied by the compressed bale, and it be found that the bale is too large to be compressed within the prescribed limits by the power applied through the toggle-arms, the water from cylinder S may be allowed to escape until the bale is in such a position as to utilize the greatest available power of the toggle-arms. If, on the contrary, the bale be a small one and is not sufficiently compressed in the nine-inch space, water may be forced into the cylinder and the compression continued by the rams after the toggles cease to act.

Having thus described my invention, what I claim as new is—

1. In a progressive-lever or toggle-arm press, one of the platens composed of two parts, one part having cylinders and water-ways, the other part having rams or pistons, with suitable packing.

2. The herein-described method of regulating the space between the platens of lever or toggle-arm presses, by forcing water in or letting the same out from between the stationary and movable parts of a compound platen, substantially in the manner and for the purpose described.

JOHN F. TAYLOR.

Witnesses:
I. N. McGIBBON,
JAS. S. SIMONS.